United States Patent [19]

Moriwaki

[11] Patent Number: 4,796,261
[45] Date of Patent: Jan. 3, 1989

[54] ERROR CORRECTION APPARATUS FOR DIGITAL DATA

[75] Inventor: Hisayoshi Moriwaki, Kanagawa, Japan

[73] Assignee: Sony Corporation, Tokyo, Japan

[21] Appl. No.: 5,786

[22] Filed: Jan. 22, 1987

[30] Foreign Application Priority Data

Jan. 31, 1986 [JP] Japan ................... 61-19676

[51] Int. Cl.$^4$ .............................................. G06F 11/00
[52] U.S. Cl. ......................................... 371/40; 371/39
[58] Field of Search .................... 371/37, 38, 39, 40

[56] References Cited

U.S. PATENT DOCUMENTS

| | | | |
|---|---|---|---|
| 4,546,474 | 10/1985 | Sako | 371/40 |
| 4,562,578 | 12/1985 | Odaka | 371/40 |
| 4,637,021 | 1/1987 | Shenton | 371/40 |
| 4,646,170 | 2/1987 | Kobayashi | 371/38 |
| 4,646,301 | 2/1987 | Okamoto | 371/37 |
| 4,706,250 | 11/1987 | Patel | 371/38 |

Primary Examiner—Michael R. Fleming
Attorney, Agent, or Firm—Curtis, Morris & Safford

[57] ABSTRACT

An error correcting system in which received digital data is subjected to correcting processes by first and second error correction codes alternately is provided with memories to store first and second series error pointers for a plurality of series of the first and second error correction codes, and such first and second series error pointers are read to determine which series are without error, whereupon the correcting processes of the first and second error correction codes are omitted with respect to the error-free series. As a result, the number of times effective correcting processes can be repeated within a limited time is increased and the correcting capability can be substantially improved.

8 Claims, 4 Drawing Sheets

ERROR CORRECTION APPARATUS FOR DIGITAL DATA

BACKGROUND OF THE INVENTION

1. Field of the Invention

This invention relates generally to the correction of digital signals and, more specifically, is directed to the correction of errors in digital audio signals which are, for example, recorded on a magnetic tape or the like.

2. Description of the Prior Art

It is known to use the so-called cross-interleave technique for transforming a digital data signal into an error correctable code structure for digital data transmission or for recording and reproducing. It is the usual practice, when using the cross-interleave technique, to use modulo-2 adders to generate two parity series P and Q, each representing predetermined numbers of the data words in two different arrangements. Because each word of the digital data signal will be contained in the two parity series, this known cross-interleave technique provides a substantial error correcting capability, particularly when the correcting processes are repeatedly performed.

In the error correcting system employing the cross-interleave technique in a conventional PCM tape recorder, for example, a so-called 8 mm VTR for digital audio signals, if only one error word is found to exist in the P or Q series by detecting word error pointers of such series, that single error word is corrected. However, in all other cases, that is, when no error word exists so that it is unnecessary to correct the same, or when two or more error words exist and hence cannot be corrected, the word error pointers are merely read out and no error correction process is performed. Thus, when no error word exists or when two or more error words exist, the time required to read out the word error pointers is wasted.

When using the cross-interleave technique, the number of error words that can be corrected is increased, so that the error correcting capability is improved, by increasing the number of times that the error correcting processes are repeated in respect to the P and Q series. However, since the overall time available for the error correcting processes is usually limited to a predetermined time interval, the previously described wasted time required for reading out word error pointers when no error correction is or can be effected, necessarily limits the number of repetitions of the correcting processes that can be performed within such limited time interval. Hence, enhancement of the correcting capability is restricted.

OBJECTS AND SUMMARY OF THE INVENTION

Accordingly, it is an object of the present invention to provide an error correcting system in which the number of times that the effective correcting processes can be repeated within the limited time available therefor is increased so as to improve the error correcting capability.

Generally, in accordance with this invention, in an error correcting system in which the digital data is transformed into an error correctable code structure including first and second error correction codes, and the correcting processes by the first and second error correction codes are alternately performed, a memory is provided for storing first series error pointers indicating the presence or absence of an error in each of the first error correction code series, and a memory is provided for storing second series error pointers indicating the presence or absence of an error in each of the second error correction code series, and the first or second series error pointers are read out from the respective memory before performing the error correcting processes by the first or second error correction code for the respective series with the correcting processes being omitted in respect to each series which is indicated to be free of error by the respective first or second series error pointer.

It will be appreciated that, by referring to the series error pointer indicative of the presence or absence of an error in the words forming the respective series under consideration, it is possible to omit the reading out of the word error pointers for determining whether or not the correcting processes can be or even need to be performed. When the correcting processes are repeatedly performed, the number of error words to be corrected gradually decreases so that the number of series having no error is increased. Thus, in accordance with the invention, the time wasted in accessing the word error pointers for series that contain no errors can be drastically reduced with the result that the numbers of error words that can be corrected within a limited time is increased.

The above, and other objects, features and advantages of the present invention, will be apparent in the following detailed description of the invention which is to be read in connection with the accompanying drawings.

DETAILED DESCRIPTION OF A PREFERRED EMBODIMENT

An embodiment of the present invention will hereinafter be described as applied to error correction of PCM audio signals recorded and reproduced by a conventional or standard 8 mm. VTR. In such 8 mm. VTR, a magnetic tape having a width of 8 mm. is wound around the peripheral surface of a rotary drum with a wrap angle of 221°. Within this wrap angle, a range of 180° is used as the recording region for video signals, and a range of 36° is used as the recording region for PCM audio signals. A pair of rotary heads are attached to the drum with an angular distance of 180° therebetween, and the drum is rotated at the frame frequency. The rotary heads move obliquely across the magnetic tape in sliding contact therewith so as to trace successive slant or oblique tracks. The video signal for one field is supplied to one of the rotary heads so as to be recorded thereby in a respective track while scanning the recording region for the video signals. The PCM audio signals for one field, after having been encoded with the error correction code and subjected to suitably time base compression, are supplied to one of the heads so as to be recorded thereby in the respective track while scanning the recording region for PCM signals.

In the 8 mm. VTR, the encoding and decoding processes for error correction are executed with the PCM audio signals for one field being used as a unit, for example, as disclosed in detail in U.S. Pat. No. 4,562,578, having an assignee in common herewith. Such unit is comprised of 132 blocks, with each block including 8 words of digital audio data $W_0$–$W_7$ and 2 words of parity data P and Q. A cyclic redundancy check (CRC) code for error detection is added to the data of each block, and each block further has added thereto, before its recording, a block synchronizing signal and a block address signal, as indicated on FIGS. 1A and 2. If the data of the first block is taken out of context and examined separately, it will appear as shown in FIG. 2, it being understood that, after this first block, there will follow the second block, the third block, - - - up to the 132d block, moving from left to right on FIG. 1A.

Figure 1A:
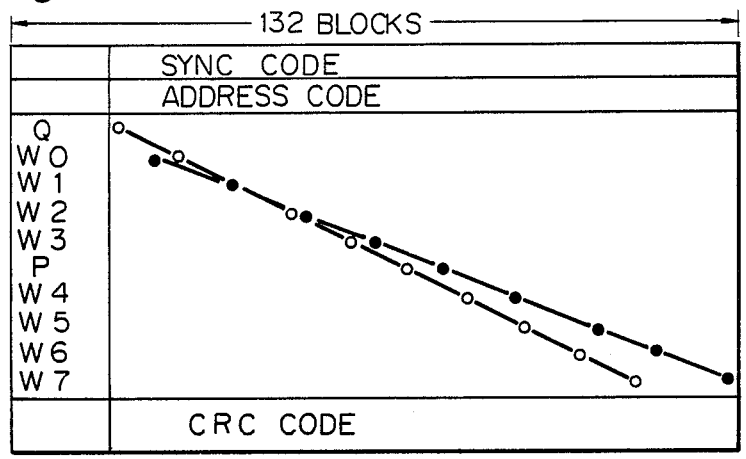
FIG. 1A is a diagrammatic representation of the arrangement of data and the relationship thereof to parity series that have been used in recording PCM audio signals.
Figure 2:
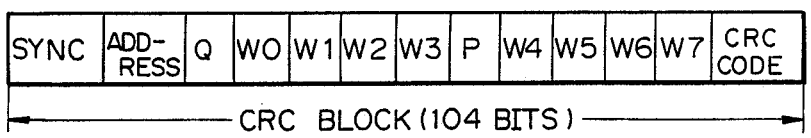
FIG. 2 is a diagrammatic representation of a block of data to which the invention may be applied.

In the two-dimensional or matrix arrangement of the data unit shown on FIG. 1A, each of the 132 blocks arranged laterally one after the other contains 8 data words, that is, there are 1056 words in the data unit. The digital audio signal of one field in the NTSC system is comprised of 1050 words with each word consisting of 8 bits. Therefore, 6 words of suitable control data are included in the data unit along with the audio PCM signals of the right and left channels for one field. In FIG. 1A, the data for each block is arranged in a vertical column and each of the horizontally extending lines identified as $Q, W_0, W_1, W_2, W_3, P, W_4, W_5, W_6$, and $W_7$ is comprised of 132 words of data.

A first parity series (the P series) is formed by 9 words taken from the audio data series $W_0$–$W_7$ and the parity series P with a distance between such words of 14 blocks or 15 blocks in the lateral direction, and with the words contained in this parity series P being symbolized by solid circles on FIG 1A. A second parity series Q is formed of 10 words symbolized by open circles in FIG. 1A and which are taken from the audio data series $W_0$ to $W_7$, the first parity series P and the second parity series Q with a distance of 12 blocks between adjacent symbols. As is apparent from FIGS. 1A and 2, the first parity series P is desirably positioned at the center of the respective block, while the second parity series Q is positioned at an end of the block.

As noted above, each of the data word series $W_0$–$W_7$ and each of the parity series P and Q arranged in a respective horizontal line in the matrix of FIG. 1A has 132 words in the respective series. Therefore, each element of the P and Q series can be identified by a number n (n=0 to 131).

Figure 1B:
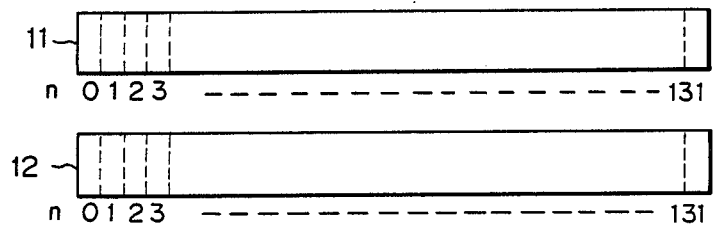
FIG. 1B diagrammatically represents the capacities of random access memories (RAMs) for storing parity series error pointers in an error correcting apparatus according to an embodiment of the invention.

As hereinafter described in detail, in accordance with the present invention, a random access memory (RAM) 11 is provided to store 1-bit error pointers for the parity series P and, similarly a random access memory (RAM) 12 is provided to store 1-bit error pointers for the parity series Q. Since there are 132 elements or words in each of the parity series P and Q, each of the series error pointer RAMs 11 and 12 has a 132 bit-capacity, as shown in FIG. 1B.

As is well known, the presence or absence of an error in each block is detected by the respective CRC code. Since simple parity is used, if the CRC check determines that only a single error word exists in the P or Q series, that single error word can be corrected. Moreover, by repeating the decoding or error correcting processes in respect to the P and Q series, the error correcting capability can be improved. As is well known, in the case of the PCM audio signals, erroneous data that cannot be corrected by the error correction code are interpolated or replaced by the average of the correct data existing before and after the uncorrected erroneous data.

Figure 3:
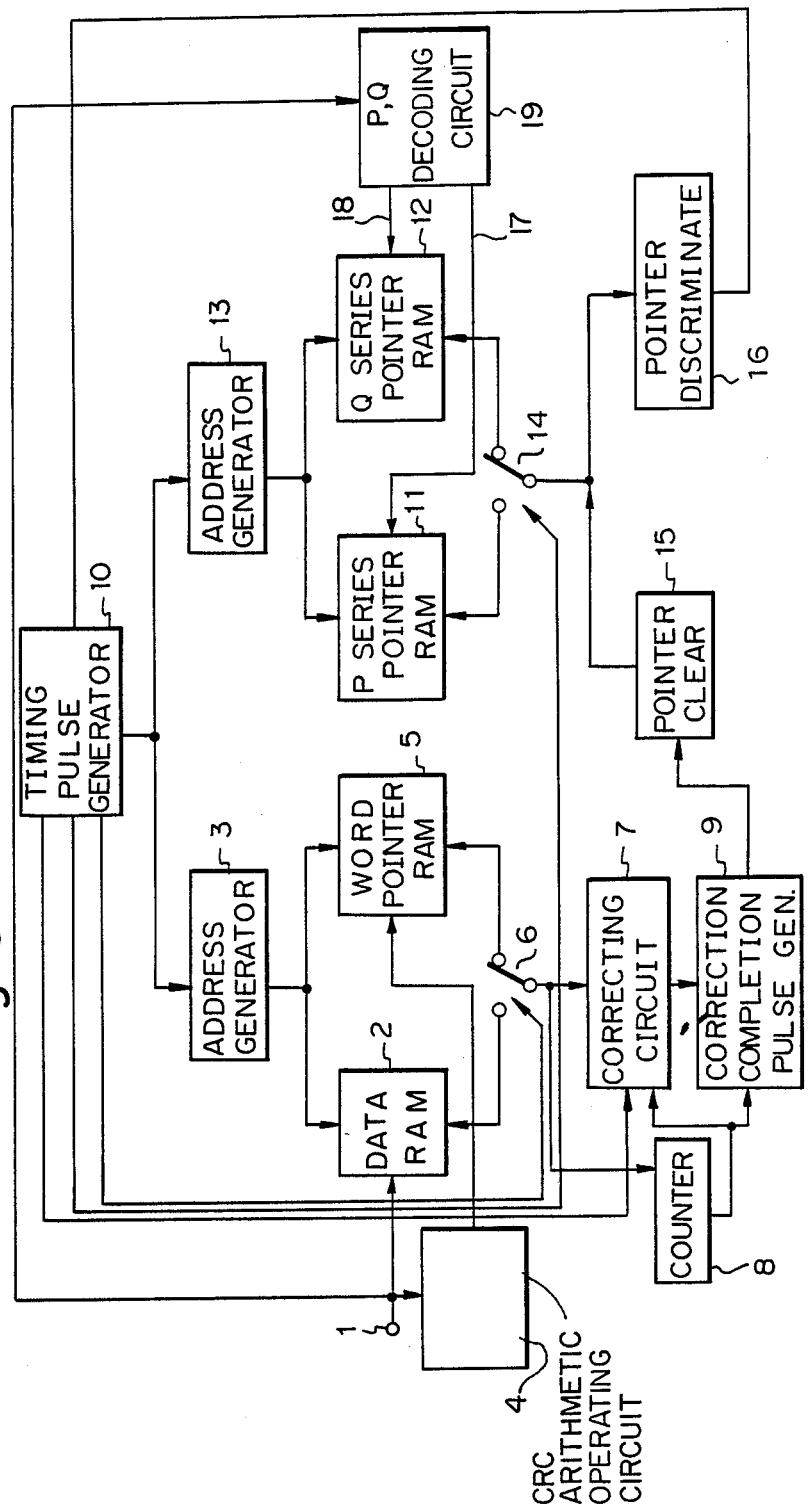
FIG. 3 is a block diagram showing an error correcting apparatus according to an embodiment of the invention.

Referring now to FIG. 3, it will be seen that, in an embodiment of the present invention there illustrated, the reproduced or received PCM data and parity data applied to an input 1 are stored or written in a data RAM 2 at addresses determined by an address generator 3. Such reproduced data, prior to being stored in RAM 2, is subjected to error detection by a CRC arithmetic operating circuit 4 which provides 1-bit word error pointers indicating whether or not an error is detected in each word. The word error pointers are applied to an input 4 and are written therefrom in a word pointer RAM 5. The data RAM 2 has a capacity suitable to store the reproduced data for one field which, as previously indicated, consists of 10 words of PCM data and parity data in each of 132 blocks. Therefore, data RAM 2 has a sufficient capacity to store 1320 words of data. On the other hand, word pointer RAM 5 has a capacity of 1320 bits, so as to be capable of storing a 1-bit word error pointer for each of the words included in one field of data. The addresses in the word pointer RAM 5 at which the word error pointers are written are also determined by address generator 3. The data stored in data RAM 2 and the word error pointers stored in word pointer RAM 5 are supplied through a switching circuit 6 to a correcting circuit 7 and a counter 8.

In order to perform the correcting processes of the P series, the 9 word error pointers indicating the 9 words forming the first of the P series are read from word pointer RAM 5 and passed through switching circuit 6 to counter 8. If only one word error pointer corresponding to a word error is detected by counter 8, the latter causes correcting circuit 7 to correct the corresponding single error word, whereupon the corrected data or word is written into data RAM 2 in place of the error word and, at the same time, the word error pointer corresponding to the corrected error word is cleared from word pointer RAM 5. If no error word is detected, or if two or more error words are detected or counted among the 9 word error pointers corresponding to the first P series, no correcting process is executed, that is, correcting circuit 7 is inoperative to correct any data in RAM 2. The foregoing operations are repeated with respect to each of the 132 series of the P series, and also in respect to each of the 132 series of the Q series.

When no error word is detected or counted by counter 8, or when one error word has been corrected by correcting circuit 7, a correction completion pulse generating circuit 9 is operated to produce a correction completion pulse for a purpose hereinafter described in detail.

A timing pulse generator 10 is provided to produce suitable timing pulses for controlling the operations of address generator 3, switching circuit 6 and correcting circuit 7. When word error pointers are being read out from word pointer RAM 5 to be counted by counter 8 and when the word error pointers in RAM 5 are cleared after the correction of an error word, switching circuit 6 is disposed in the condition illustrated on FIG. 3, that is, word pointer RAM 5 is connected to correcting circuit 7 and counter 8 by switching circuit 6. On the other hand, when an error word in data RAM 2 is to be replaced by a corrected word, switching circuit 6 is changed-over to connect RAM 2 with correcting circuit 7.

As previously noted, the 1-bit P series error pointers and the 1-bit Q series error pointers are stored in P and Q series pointer RAMs 11 and 12. The parity series error pointer RAMs 11 and 12 are addressed, in common, by an address generator 13 in response to timing pulses from generator 10. As earlier noted, each of the P and Q series includes 132 series, and the respective 1-bit series error pointers are stored at 132 respective addresses in RAMs 11 and 12, respectively. Each of the parity series error pointers may have the logic level or value "1" to indicate that an error word exists in the respective parity series, whereas the series error pointer has the value "0" to indicate that no error word exists in the respective series. All of the series error pointers are initially set at the high value "1", and each of the series error pointers is cleared or changed to the low value "0" when no error word exists in the respective parity series and when a single error word has been corrected.

A switching circuit 14 is provided to alternately connect the P and Q series error pointer RAMs 11 and 12 to a pointer clearing circuit 15 and to a pointer discriminating circuit or detector 16. The pointer clearing circuit 15 is connected to generator 9 for receiving the correction completion pulse from the latter and, in response to such correction completion pulse, pointer clearing circuit 15 is effective to clear or return to "0" the pointer of the respective series of the P or Q series which has no error. In other words, the P or Q series error pointer for the P or Q series in which an error word was corrected by circuit 7 is cleared to "0". The pointer discriminating circuit 16 determines whether the P or Q series error pointer addressed in the RAM 11 or 12, respectively, is "0" of "1", and timing pulse generator 10 is actuated in response to such detection or discrimination.

As shown on FIG. 3, the switching operation of switching circuit 14 is also controlled by timing plses from timing pulse generator 10. Finally, the P and Q series error pointer RAMs 11 and 12 are adapted to receive the respective series error pointers from outputs 17 and 18, respectively, of, for example, a suitable P,Q decoding circuit 19. It will be understood that, during the correction of the Q series, the Q series error pointer RAM 12 is connected to pointer clearing circuit 15 and pointer discriminating circuit 16 by the switching circuit 14 in the condition shown. On the other hand, during the correction of the P series, switching circuit 14 is changed-over to connect the P series error pointer RAM 11 with circuits 15 and 16.

In the case of the application of the present invention to an 8 mm. VTR, there will be two sets of the data RAM 2, error word pointer RAM 5, P series error pointer RAM 11 and Q series error pointer RAM 12 for processing the PCM signals of alternate fields. Thus, during a field in which the PCM signal is being written in one set and error correcting operation are being performed thereon, the previously corrected PCM signal and word error pointers are being read out from the other set.

Figure 4:
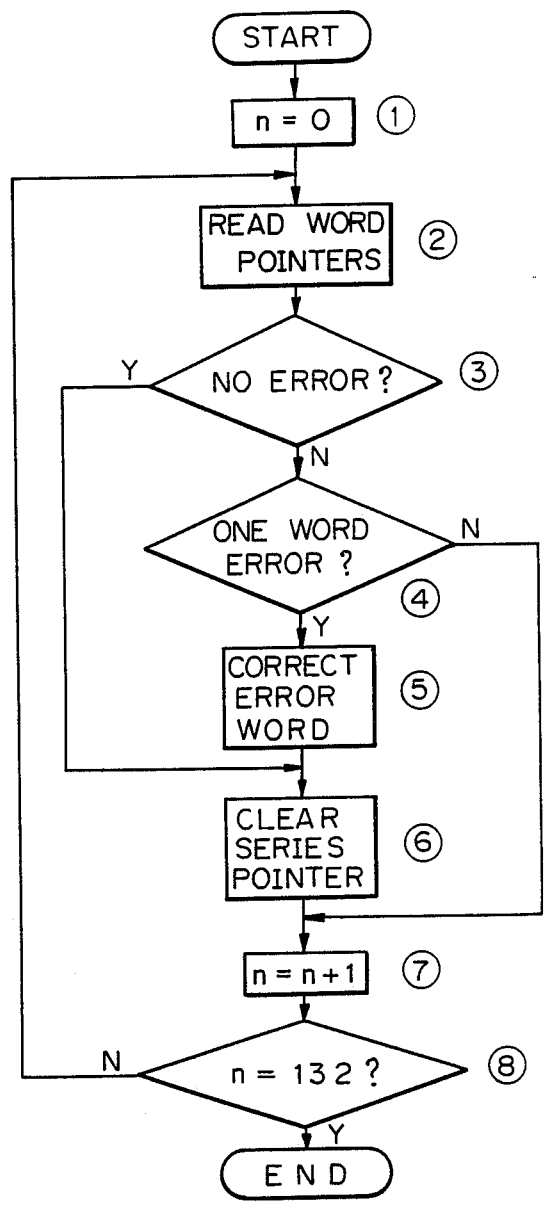
FIGS. 4 and 5 are flow charts to which reference will be made in explaining the operation of the error correcting apparatus according to an embodiment of the invention.
Figure 5:
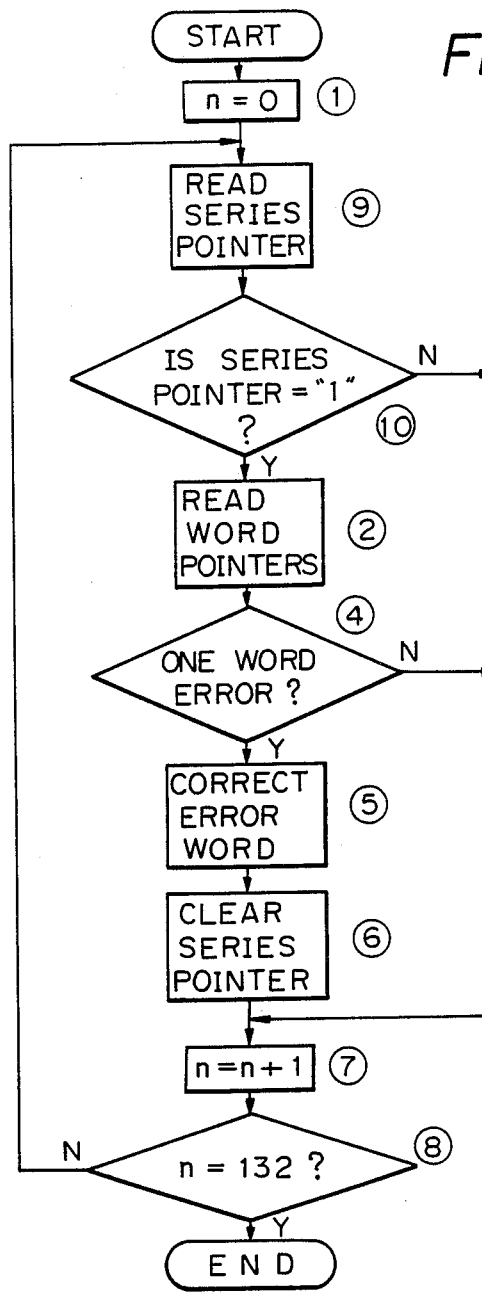

The correction of errors in the above described embodiment of the invention will now be described with reference to the flow charts in FIGS. 4 and 5. The first correcting processes are illustrated in FIG. 4 and will be described with respect to an example in the P series.

In step (1) the number n of the 132 series of the P series is initialized to "0". In step (2), the word error pointers for the 9 words forming the P series identified by n=0 are read out of word error pointer RAM 5. In step (3), it is determined by counter 8 if there is no error word among the 9 words forming the P series identified by n=0. Of course, during steps (2) and (3) switching circuit 6 remains in the position shown on FIG. 3 for connecting word error pointer RAM 5 with counter 8. If the answer to decision outline (3) in FIG. 4 is "N" or "NO", that is, one or more error words are counted by counter 8 among the 9 word error pointers corresponding to the P series identified by n=0, the program moves to step (4) in which it is determined if there is only one error word.

On the other hand, if the answer to decision outline (3) is "YES" or "Y", that is, if no error word is detected among the 9 words of data forming the P series identified by n=0, the program skips to step (6) in which correction completion pulse generator 9 causes pointer clearing circuit 15 to clear the series error pointer stored in P series error pointer RAM 11 at the address for the P series identified by n=0. Of course, at the time of such clearing of the series error pointer, switching circuit 14 is changed over to connect RAM 11 with pointer clearing circuit 15.

If the answer to the decision outline (4) is "YES" or "Y", that is, if one error word is detected in step (4), such error word is corrected in step (5), and then the program proceeds to step (6) in which generator 9 provides a correction completion pulse for causing pointer clearing circuit 15 to clear the series error pointer at the address in RAM 11 corresponding to the P series identified by n=0. Of course, during such correction of an error word, switching circuit 6 is changed-over to connect data RAM 2 with correcting circuit 7.

On the other hand, if the answer to decision outline (4) is "NO" or "N", that is, if two or more error words have been detected among the 9 data words forming the P series identified by n=0, no correcting process is or can be performed, that is, the program skips from step (4) to step (7) in which the P series number n is increased by (+1), that is, to n=1. Similarly, upon the completion of step (6) in which the series error pointer for the P series identified by n=0 is cleared, the program moves to step (7) in which the identifying number n of the P series is incremented. The program moves from step (7) to step (8) in which it is determined whether the first correcting processes for the 132 series of the P series have been performed. In other words, step (8) determines if n=132. If it is found that n=132, the first correction processing operation for the P series is terminated. However, if n is found to be less than 132 in step (8), the program returns to step (2). After the first correcting processes have been completed in respect to the P series, the first correcting processes are similarly executed in respect to the Q series.

As earlier noted, the correction processing operations are desirably repeated in respect to the P series and the Q series. The second and each subsequent correction processing operation will now be described with reference to FIG. 5 in which steps corresponding to those described above with reference to FIG. 4 are identified by the same reference numerals. Once again, the specific description of the correction processing operation illustrated on FIG. 5 will be with reference to an example in the P series.

In the second or subsequent correction processing operation, the number n identifying the series of the P series is initially set to n=0 in step (1). Then, with switching circuit 14 changed-over to connect RAM 11 with pointer discriminating or detecting circuit 16, the program proceeds to step (9) in which the 1-bit P series error pointer stored at the address for n=0 is read out of RAM 11. In step (10), pointer discriminating circuit 16 detects if the P series error pointer being read out of RAM 11 is "1", that is, if an error word is included in the 9 words of data which form the series of the P series identified by n=0. If the answer to the decision outline (10) is "YES" or "Y", that is, if the P series error pointer read out of RAM 11 is "1", the program moves from step (10) to step (2) in which pointer discriminating circuit 16 actuates timing pulse generator 10 for causing the word error pointers corresponding to the data words forming the series of the P series identified by n=0 to be read out of RAM 5. In the next step (4) counter 8 determines from the word error pointers read out of RAM 5, if one error word exists among the 9 words making up the P series. If only one error word is detected in the P series being considered, the program moves to step (5) in which the single error word is corrected by correcting circuit 7 and, thereafter, correction completion pulse generator 9 and pointer clearing circuit 15 are operative to clear to "0" the series error pointer stored in RAM 11 at the address corresponding to the P series identified by n=0. If two or more error words are detected by counter 8 in step (4), the error correcting step (5) and the series error pointer clearing step (6) are omitted and the program proceeds to step (7). Similarly, if the 1-bit P series error pointer read from the address in RAM 11 corresponding to n=0 is "0", that is, if the series error pointer detected in step (10) is not "1", from which it follows that no error word exists in the 9 data words forming the P series being considered, the program skips steps (2),(4),(5) and (6) and proceeds directly to step (7). In step (7) the number n identifying the series of the P series being considered is incremented by 1, and then the program proceeds to step (8) in which it is determined whether n=132. If n is less than 132, the program is returned to step (9), whereas, if n=132, the program is terminated. In other words, the second or subsequent correction processing operation illustrated in FIG. 5 is repeated in respect to each of the P sries. Similarly, the second and subsequent correction processing operations are performed in respect to the Q series.

It will be appreciated that error correction in accordance with the present invention is not limited to digital data that has been transformed into an error correctable code structure by the cross-interleave technique, but can be similarly applied to the product code for performing error correction coding processes in the vertical and horizontal directions of the two-dimensional data arrangement. Further, the error correction code that is used is not limited to the simple parity code employed in the described example, but other codes, such as, the Reed-Solomon code or the like can also be used.

It will be appreciated that, in correcting errors according to the invention by means of two or more correction series and by repeating the correcting processes in respect to each series, the correcting processes are omitted in respect to any of such series devoid of error. Therefore, the number of repetitions of the correcting processes that can be effected in respect to each series within a specified time can be increased as compared with conventional error correcting systems in which the correcting processes are performed even in respect to series that do not contain error.

Having described an illustrative embodiment of the invention, it is to be understood that the invention is not limited to that precise embodiment, and that various changes and modifications can be effected therein by one skilled in the art without departing from the spirit or scope of the invention as defined in the appended claims.

What is claimed is:

1. An apparatus for correcting errors in received digital data signals having parity series and CRC codes, comprising:
    means for generating word error pointers on the basis of the CRC codes included in said received digital signals;
    word error pointer memory means for storing said word error pointers;
    means for generating series error pointers of predetermined parity series of said received digital signals;
    parity series error pointer memory means for storing said series error pointers;
    means for reading out said word error pointers of said predetermined parity series from said word error pointer memory means;
    counting means for determining how many of said word error pointers read from said word error pointer memory means indicate error words;
    means for correcting errors included in said received digital signals of said predetermined parity series when only one of said word error pointers read from said word error pointer memory means indicates an error word; and
    means for clearing the series error pointer for the error corrected series from said parity series error pointer memory means.

2. An apparatus according to claim 1; further comprising pointer discriminating means for checking the series error pointers stored in said parity series error pointer memory means, and being operative, when the checked series error pointer shows no error, to check the next series error pointer without reading out the corresponding word error pointers from said word error pointer memory means.

3. An apparatus according to claim 1; wherein all of said series error pointers in said parity series error pointer memory means are set at the beginning of an error correcting operation on a predetermined amount of said received digital data.

4. An apparatus according to claim 1; wherein said clearing means also clears the corresponding series error pointer when said counting means shows no error in the words corresponding to the read out word error pointers.

5. a method for correcting errors in received digital data signals having parity series and CRC codes, comprising the steps of:

generating word error pointers on the basis of the CRC codes included in said received digital signals;

storing said word error pointers;

generating series error pointers of predetermined parity series of the received digital signals;

storing said series error pointers;

reading the stored word error pointers of said predetermined parity series;

determining how many of said word error pointers which are read indicate error words;

correcting errors included in the received digital signals of said predetermined parity series when only one error word is indicated by the word error pointers which are read; and clearing the stored series error pointer corresponding to the error corrected series.

6. A method according to claim 5; further comprising the steps of checking one of the stored series error pointers and, when the checked series error pointer shows no errors in any of the corresponding words, checking the next series error pointer without reading the stored word error pointers.

7. A method according to claim 5; in which all of said series error pointers are set at the initiation of the error correcting operation on a predetermined amount of said received digital data.

8. A method according to claim 5; further comprising also clearing the corresponding series error pointer when the word error pointers which are read indicate no word errors.

* * * * *